(12) United States Patent
Fuller et al.

(10) Patent No.: US 6,345,875 B1
(45) Date of Patent: Feb. 12, 2002

(54) FIELD PROGRAMMABLE PRINT CONTROL

(75) Inventors: Hugh L. Fuller, Webster; Kurt L. Jacobs, Fairport, both of NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/232,462

(22) Filed: Jan. 19, 1999

(51) Int. Cl.[7] .................. B41J 29/38; B41J 29/393; B41J 11/44
(52) U.S. Cl. .................. 347/9; 347/19; 400/76
(58) Field of Search .................. 347/9, 5, 40, 44, 347/49; 400/61, 70, 76

(56) References Cited

U.S. PATENT DOCUMENTS

| | | |
|---|---|---|
| 4,437,122 A | 3/1984 | Walsh et al. |
| 5,029,108 A | 7/1991 | Lung |
| 5,270,728 A | 12/1993 | Lund et al. |
| 5,552,991 A * | 9/1996 | Lee et al. .............. 364/464.02 |
| 5,563,591 A | 10/1996 | Jacobs et al. |
| 5,610,635 A * | 3/1997 | Murray et al. .................. 347/7 |
| 5,867,182 A * | 2/1999 | Nakagawa ...................... 347/9 |
| 5,937,152 A * | 8/1999 | Oda et al. .................... 395/115 |
| 6,027,197 A * | 2/2000 | Kaburagi et al. ............... 347/9 |
| 6,116,716 A * | 9/2000 | Tajika et al. .................... 347/19 |
| 6,128,098 A * | 10/2000 | Kamada et al. .............. 358/1.8 |
| 6,149,257 A * | 11/2000 | Yanaka et al. .................. 347/9 |

* cited by examiner

Primary Examiner—John Barlow
Assistant Examiner—Alfred E. Dudding
(74) Attorney, Agent, or Firm—Oliff & Berridge, PLC

(57) ABSTRACT

Apparatus and methods for field programmable print control of an ink jet printer allow the timing and control parameters of the ink jet printer to be altered. This allows a user to replace the printhead with a higher resolution printhead. The ink jet printer has a timer processing unit that contains the timing and control parameters needed by the ink jet control circuit to generate the printhead control signals. The timer processing unit is connected to a timer interface, which may be a programmable logic interface. The timer interface receives high level timing and control signals from a data source outside the ink jet printer controller and translates the timing and control signals into timing and control data for the timer processing unit. The data source may be a computer connected to the ink jet printer. Alternatively, the data may be stored in a memory of a replacement printhead and downloaded to the controller upon replacing a current printhead with the replacement printhead. The data may be alternatively entered by a user or service technician via a user interface of the ink jet printer.

15 Claims, 4 Drawing Sheets

FIELD PROGRAMMABLE PRINT CONTROL

BACKGROUND OF THE INVENTION

1. Field of Invention

This invention relates to ink jet printers. More particularly, this invention is directed to apparatus and methods that allow ink jet printer control parameters to be dynamically programmed or updated.

2. Description of Related Art

An inkjet printer records information by selectively ejecting droplets of ink from a printhead to form a desired image on an image receiving medium such as a sheet of paper. A principal factor in ink jet image print quality is the print resolution, measured in dots-per-inch (dpi) horizontally and vertically. For instance, an image with a resolution of 600×600 dpi provides a much higher quality image than a 300×300 dpi resolution image.

A number of prior art systems have been directed at efforts to increase the resolution of ink jet printers. In particular, U.S. Pat. No. 5,270,728 to Lund et al., U.S. Pat. 5,029,108 to Lung, and U.S. Pat. No. 4,437,122 to Walsh et al., each of which is incorporated herein by reference in its entirety, are directed to schemes for maximizing the resolution of an ink jet printer with a given printhead. Additionally, U.S. Pat. No. 5,563,591 to Jacobs et al., which is incorporated herein by reference in its entirety, discloses an ink jet printer system in which LCD-displayed fiducial markings are repositioned to change the ink jet print resolution. The spacing of the fiducial markings on the LCD can be varied to alter the timing, positioning and movement of the carriage which holds the printhead, to the extent allowed for a given printhead of the ink jet printer.

SUMMARY OF THE INVENTION

The prior art ink jet printers attempt to enhance printer resolution by altering the print position of particular pixels or changing the pixel printing pattern subject to a given set of control parameters for a particular printhead. The resolution enhancement systems disclosed in Lund, Lung and Walsh are directed towards ink jet printers with fixed timing and control parameters set for a particular printhead configuration. In these systems, the ink jet printer image resolution is ultimately limited by the capabilities of the printhead itself. These pixel-shifting schemes, which use a given printhead, allow only a limited amount of image improvement. Jacobs' system alters the spacing of the LCD-displayed fiducial markings, but does not change the control parameters when a new printhead is inserted.

This invention provides apparatus and methods that enable field programmable print control of ink jet printers.

Such field programmable print control alters the timing and control parameters of the ink jet printer and allows a user to replace a current printhead with a higher resolution printhead. The ink jet printer according to this invention includes a timer processing unit programmed with timing and control parameters needed by the ink jet processing unit to formulate printhead control signals. The timer processing unit is connected to a timer interface, which may be a programmable logic interface. The timer interface receives high level timing and control inputs from a data source outside the ink jet printer controller and translates them into timing and control data for programming the timer processing unit. The data source may be a personal computer, or may be stored in the printhead itself and downloaded upon replacement, or may be entered by a user or service technician via a user interface of the ink jet printer.

BRIEF DESCRIPTION OF THE DRAWINGS

The invention will be described with reference to the following drawings in which like reference numerals refer to like elements and wherein.

DETAILED DESCRIPTION OF PREFERRED EMBODIMENTS

Figure 1:
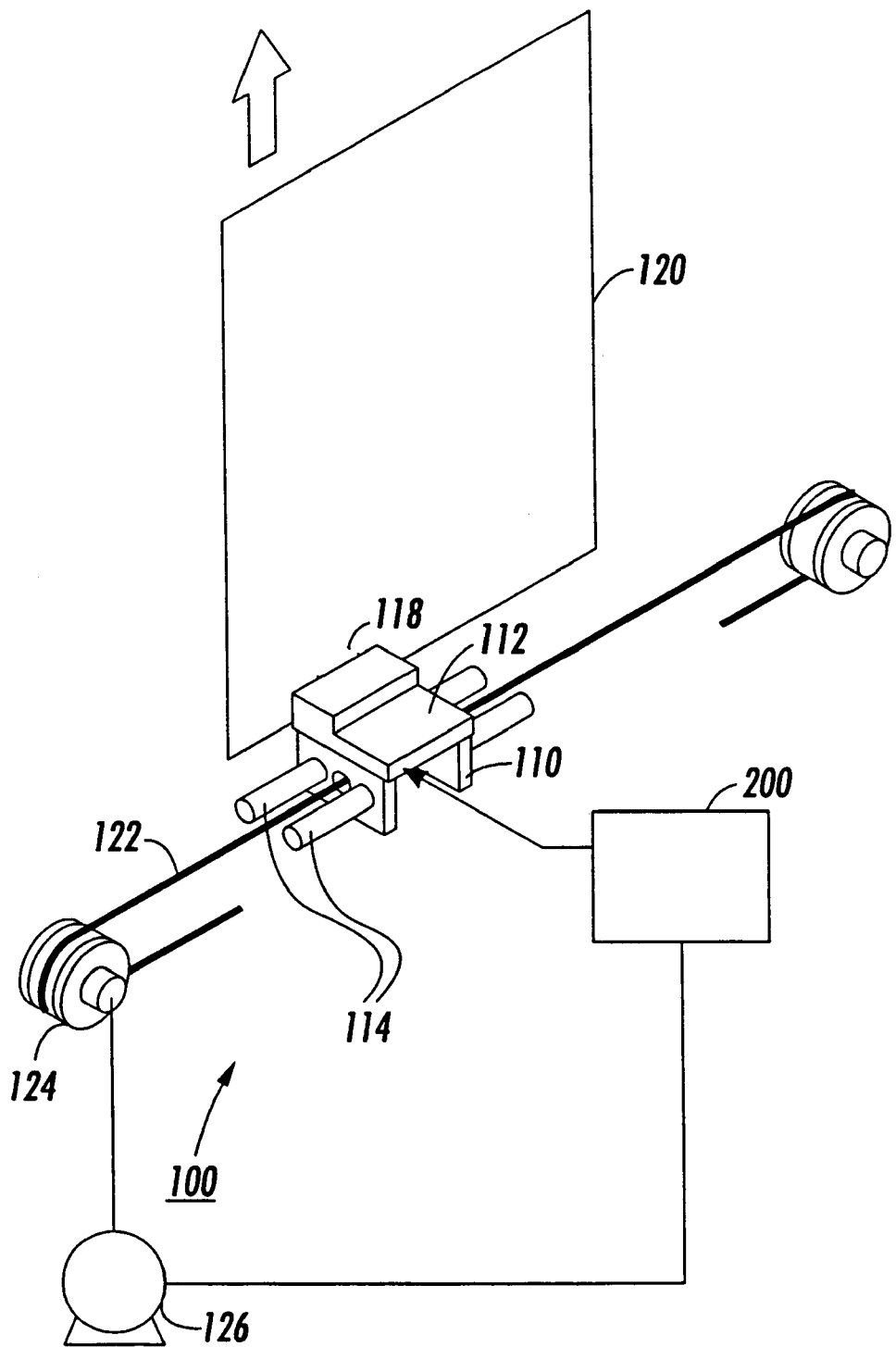
FIG. 1 shows a carriage assembly and supporting structure of an ink jet printer.

FIG. 1 shows a carriage assembly 110 and the supporting structure of an ink jet printer 100. The inkjet printer 100 includes a controller 200, a carriage assembly 110, a printhead 112, guide rails 114, ink droplets 118, an image receiving medium 120, a cable 122, rotatable pulleys 124 and a reversible carriage motor 126. The ink jet printer 100 is generally connected to one or more computers by a dedicated cable or via a local area network (LAN), a wide area network, an intranet, the Internet, or any other distributed processing network, or any other known or later developed connection system. In this way, the one or more computers connected to the ink jet printer 100 can send image data to be printed.

The printhead 112 is attached to the carriage assembly 110. The printhead 112 is typically removable from the carriage assembly 110. This allows the printhead 112 to be easily replaced by a user when it runs out of ink or is subject to failure of a component. The printhead 112 is typically replaced because the printhead 112 tends to be relatively inexpensive compared to the ink jet printer 100 as a whole. The carriage assembly 110 is supported by two parallel guide rails 114. Alternatively, the carriage assembly 110 may be supported by another configuration of guide rails or any other known or later developed device that allow the carriage assembly 110 to be moved back and forth relative to the image receiving medium 120.

The printhead 112 has a linear array of droplet-producing channels in which ink is heated by heating elements (not shown). The thermal energy added by the heating elements causes the ink to change states, producing a rapid change in the volume of the heated ink as it vaporizes. This results in the ink droplets 118 being controllably ejected through the array of droplet-producing channels onto the receiving medium 120 by force of kinetic energy. Sound energy (transducers) may also be used to control ejection of ink droplets 118.

Printing occurs as the carriage assembly 110 and attached printhead 112 are moved along the guide rails 114 back and forth in the fast scan direction relative to the image receiving medium 120. The receiving medium 120 may be, for example, paper, labels, viewgraphs, or the like. The receiving medium 120 can be stored on a supply roll or fed into the inkjet printer 100 as a single sheet of paper. The image receiving medium 120 is stepped a predetermined amount in the process direction perpendicular to the guide rails 114 each time the printhead 112 passes across the receiving medium 120. This allows the printhead 112 access to substantially all portions of the image receiving medium 120 as it is fed through the ink jet printer 100.

The reversible carriage motor 126, under the control of the controller 200, moves the carriage assembly 110 along the guide rails 114 in a controlled manner. In the configuration shown, the reciprocal movement of the printhead 112 is achieved by cable 122 and a pair of rotatable pulleys 124 which are powered by the carriage motor 126. Other structures and methods of reciprocating the carriage assembly 110 are also known within the art.

The controller 200 provides signals for controlling the linear motion, the positioning and the timing of the carriage assembly 110 and the printhead 112. These control signals for linear motion, positioning and timing interact to determine the linear print resolution. Further, it should be understood that the above description of the ink jet printing device 100 is merely illustrative and is not limiting. That is, other structures are also within the scope of the systems and methods of this invention.

Figure 2:
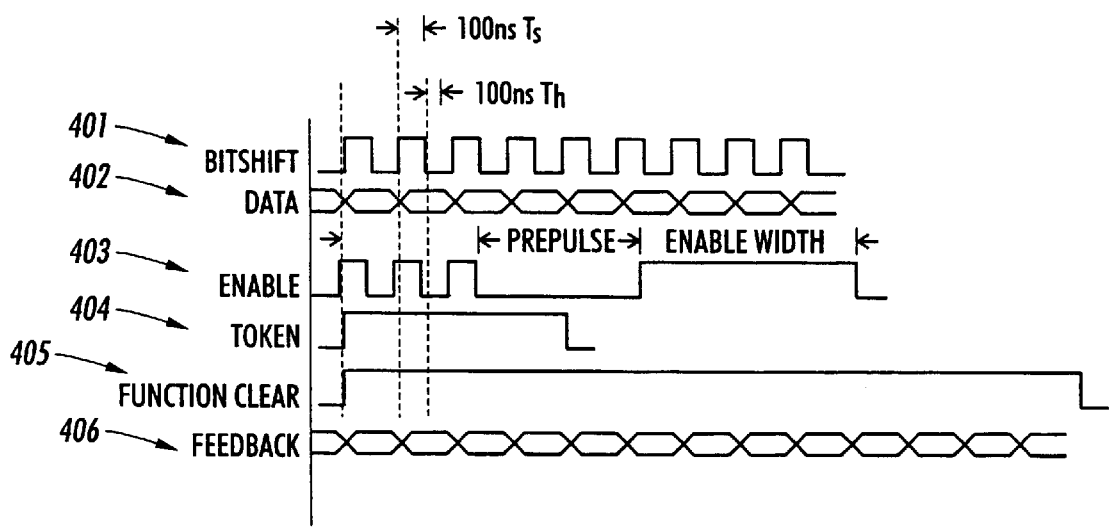
FIG. 2 shows an exemplary timing diagram for an in jet printer according to this invention.

FIG. 2 shows an exemplary set of timing and control signals for an ink jet printer according to this invention. The timing and control signals include a bitshift signal 401, a data signal 402, an enable signal 403, a token signal 404, a function clear signal 405 and a feedback signal 406.

The rising edge of the bitshift signal 401 indicates that the next N bits of data are going to be shifted in. Therefore, the appropriate register within a control circuit of the printhead 112 is connected to receive the data. The width of the bitshift signal 401 signifies the rate at which data is shifted into the register. The data signal 402 includes control signal bits, which are shifted into the appropriate shift register to control the operation of the printhead 112. One function of the data signal 402 is to indicate which of the printhead 112 droplet-producing channels (not shown) are to be fired to print droplets of ink onto the receiving medium 120. When the enable signal 403 is high, the droplet-producing channels of the printhead 112 can be fired based on the appropriate data signals 402. When the enable signal 403 is low, the enable signal 403 prevents the channels of the printhead 112 from firing. The token signal 404 controls the switching of data registers to determine which of the registers of the printhead 112 receives the data signals 402.

The token signal 404 switches the input data on the data signal 402 from one register to the next during loading of the data signals 402. The function clear signal 405 resets the data loading cycle to begin again with the first register. The feedback signal 406 allows data from the printhead 112 to be transmitted back to a printer controller (not shown). Such data includes, for example, error messages or data signals from sensors within the printhead 112. These sensors include, for example, thermistor heater element sensors.

Figure 3:
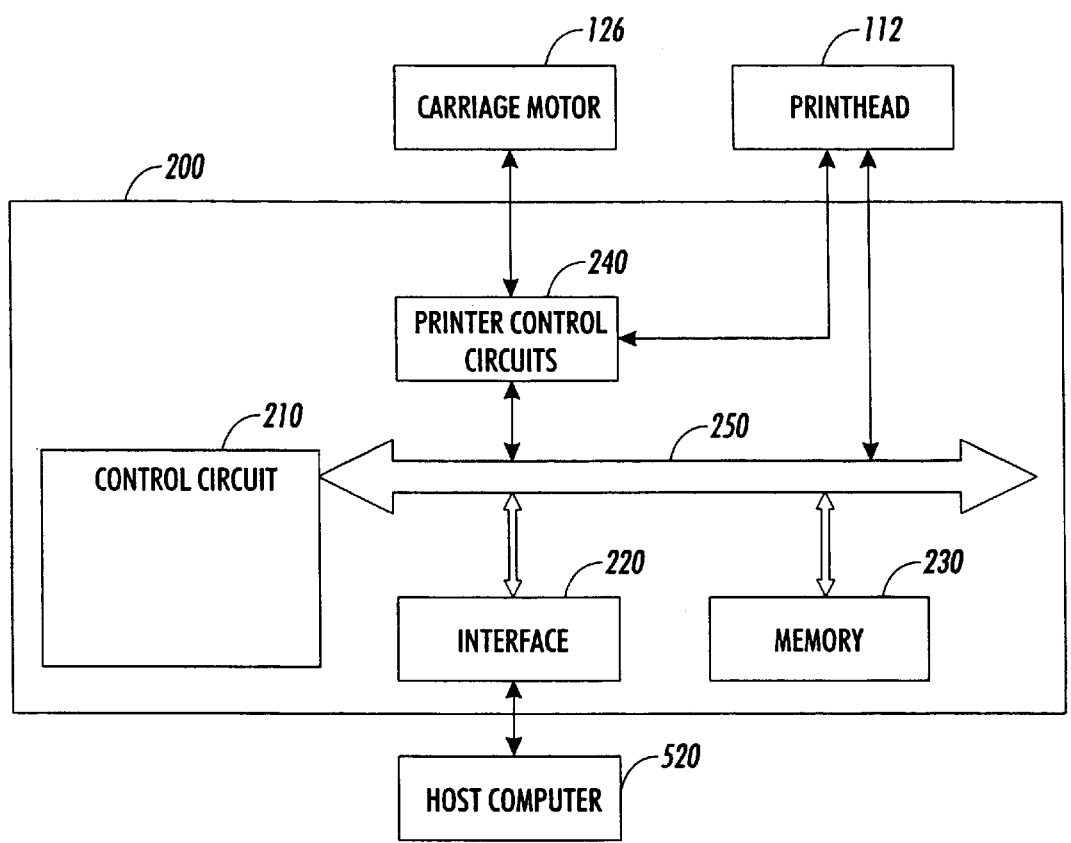
FIG. 3 shows an exemplary embodiment of a controller for an ink jet printer according to this invention.

FIG. 3 shows one exemplary embodiment of the controller 200 according this invention. The controller 200 has a control circuit 210, an interface 220, a memory 230, printer control circuits 240 and a data bus 250. The controller 200 is coupled to the carriage motor 126 and the printhead 112, and is arranged as shown in FIG. 3.

The control circuit 210 of the controller 200 sends and receives data via data bus 250 to operate the ink jet printer. The control circuit 210 accesses the memory 230, which is also connected to the data bus 250. The memory 230 includes a read-only memory (ROM) portion which stores, for instance, operating routines for the control circuit 210. The memory 230 also includes a random access memory (RAM) portion that stores data and bitmap print information received from external devices. The printer control circuits 240 are also connected to the data bus 250. The printer control circuits 240 control the operation of the carriage motor 126, as well as various paper handling and paper feed mechanisms (not shown) of the inkjet printer. Such paper handling and paper feed mechanisms are well known in the art.

Figure 4:
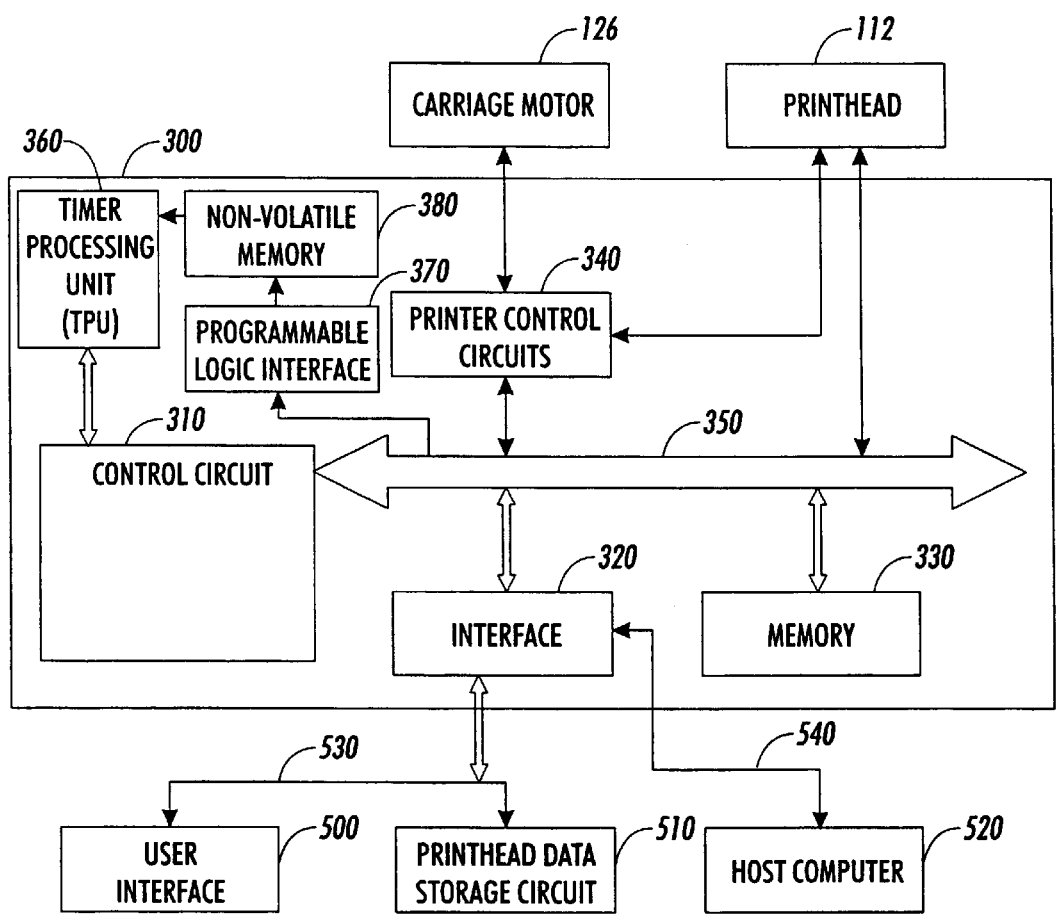
FIG. 4 shows another exemplary embodiment of the controller according to this invention.

FIG. 4 shows a second exemplary embodiment of a controller 300 according to the invention. The controller 300 has a control circuit 310, an interface 320, a memory 330, printer control circuits 340, and a data bus 350. The controller 300 is also coupled to the carriage motor 126 and printhead 112. The controller 300 also includes a timer processing unit 360, a programmable logic interface 370 and a non-volatile memory 380.

The non-volatile memory 380 is connected to the timer processing unit 360. The non-volatile memory 380 stores timing and control specifications needed to control the timer processing unit 360. The programmable logic interface 370 is connected to the non-volatile memory 380 and the data bus 350. Timing specifications and control parameters are sent in high level format to the programmable logic interface 370, via the interface 320 of controller 300. The programmable logic interface 370 parses the timing specifications and control parameters and outputs the resulting data to the non-volatile memory 380. The timer processing unit 360 is reprogrammed under control of control circuit 310. The timer processing unit 360 can be reprogrammed whenever the non-volatile memory 380 receives updated timing and control data, or during a job pre-fetch. An ink jet printer with the controller 300 can be reprogrammed with new diagnostic or maintenance functions, in addition to receiving different timing specifications and control parameters.

The timer processing unit 360 of the controller 300 is either interconnected with the control circuit 310, as shown, or may be implemented as part of the control circuit 310. For example, the timer processing unit 360 could be implemented as a software executing on a microprocessor or microcontroller. The timer processing unit 360 contains the timing specifications and control parameters that the control circuit 310 uses to set up and formulate the ink jet printer attributes and print control signals. Such timing specifications and control parameters include, for instance, signals to control the printhead positioning, to control the printhead linear movement, to control the printhead speed, to control the paper feed position and movement, to control the droplet ejection rate, to control the clock rate, to control the bitshift rate and to control the various timing parameters of the controller 300. The timer processing unit 360 enables the controller 300 to have the timing specifications and control parameters changed in the field. For instance, this allows the timing and format of the bitshift signal 401, the data signal 402, the enable signal 403, the token signal 404, the function clear signal 405 and for the feedback signal 406 to be altered.

Altering these timing specifications and control parameters enables the ink jet print resolution to be changed. Print quality independent of print resolution may also be controlled by altering the timing specifications and control parameters. For instance, the size of the ink jet droplets 118 may be varied in order to change the print quality independent of varying the print resolution. Altering the timing specifications and control parameters also enables a user to interchange the printhead with another printhead having different print resolutions and timing specifications. In this way, an inkjet printer according to this invention can readily accept higher resolution printheads as they become available through improvements in printhead technology.

As shown in FIG. 4, the timing specifications and control parameter data are supplied from any of several sources. The timing specification data, and the control parameter data can be entered by a user or service technician via a user interface 500 of the ink jet printer 100. In this case, as the timing specification data and control parameter data is input by the user or service technician, the input data is transmitted from the user interface 500 over an internal signal line 530 to the interface 320. The user interface 500 can include alphanumeric keys, dedicated function keys and/or dynamically alterable function keys. Alternatively, the timing specification data and the control parameter data can be stored in a printhead data storage circuit 510 of the printhead 112. In this case, the timing specification data and the control parameter data is transferred to the ink jet printer controller 320 after installation in the printer. The input data is transmitted from the printhead data storage circuit 510 in the printhead 112 over the internal signal line 530 to the interface 320. The printhead data storage circuit 510 can be a ROM, a PROM, an EPROM, an EEPROM, a flash memory or any other known or later developed non-volatile memory device.

Alternatively, the timing specification data and the control parameter data can be downloaded to the controller 300 from a host computer 520 connected to the ink jet printer 100 over a link 540. The link 540 can be implemented as a dedicated cable, a local area network (LAN), a wide area network, an intranet, the Internet, or any other distributed processing network, or any other known or later developed connection system. In this case, the timing specification data and the control parameter data can be input from the host computer by the user or the service technician over the link 540. The host computer can thus be located either locally to or remotely from the ink jet printer 100. In this case, the host computer 520 can receive the timing specification data and control parameter data by keyboard entry, from a computer disk or other computer readable media, or from a telephone connection by modem. To download the timing specification data and control parameter data by modem, the host computer 520 can receive data via an Internet website or by telephone connection to a service center. Other equivalent methods for downloading the timing specifications and control parameter data would be known to practitioners of ordinary skill in the art.

As shown in FIGS. 1, 3 and 4, the controllers 200 and 300 are implemented on a special purpose computer, a programmed microprocessor or microcontroller and peripheral integrated circuit elements. The controller 200 and 300 can also be implemented using an ASIC or other integrated circuit, a digital signal processor, a hardwired electronic or logic circuit such as a discrete element circuit, a programmable logic device such as a PLD, PLA, FPGA or PAL, or the like.

As shown in FIGS. 3 and 4, the memories 230, 330 and 380 are preferably implemented using a ROM and/or a static or dynamic RAM. However, the memories 230, 330 and 380 can also be implemented using a PROM, an EPROM, an EEPROM, a CD-ROM disk drive, floppy disk and disk drive, a writable optical disk and disk drive, a hard drive, a flash memory or the like.

While this invention has been described in conjunction with the specific embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A field programmable controller of an ink jet printer having a removable printhead, comprising:

a control circuit that generates printhead control signals;

a timer processing unit coupled to the control circuit and including timing and control data useable by the control circuit to generate the printhead control signals; and a timer interface coupled to the timer processing unit that converts timing and control information received from a source outside the ink jet printer for a replacement printhead having a different resolution than a replaced printhead into the timing and control data to reprogram the timing and controll data to that usable by the replacement printhead.

2. The controller of claim 1, wherein the timer interface is a programmable logic interface.

3. The controller of claim 1, further comprising:

a memory connected to the timer interface and to the timer processing unit, the memory storing the timing and control data.

4. The controller of claim 3, wherein the memory is a nonvolatile memory.

5. The controller of claim 1, further comprising a controller interface connected to the control circuit and the timer interface.

6. The controller of claim 5, wherein the controller interface receives the timing and control information from a source outside the ink jet printer.

7. The controller of claim 1, wherein the timing data and control data comprise timing specifications and control parameters used to set up attributes of the ink jet printer.

8. The controller of claim 7, wherein the timing specifications and control parameters include signals to control printhead positioning.

9. The controller of claim 7, wherein the timing specifications and control parameters include signals to control droplet ejection rate.

10. The controller of claim 7, wherein the timing specifications and control parameters includes signals to control a clock rate of a timer.

11. The controller of claim 7, wherein the timing specifications and control parameters include signals to control a bit shift rate.

12. A method of programming the timing and control parameters of an ink jet printer having a removable printhead, comprising:

receiving timing and control information from a source outside the ink jet printer for a replacement printhead having a different resolution than a replaced printhead;

translating the timing and control information into timing and control data to that usable by the replacement printhead; and generating printhead control signals for the replacement printhead based on the received timing and control data.

13. The method of claim 12, further comprising storing the timing and control data.

14. The method of claim 12, wherein the timing and control data include data relating to at least one of a bitshift signal, an enable signal, a token signal, a function clear signal and a feedback signal.

15. A field programmable controller of an ink jet printer having a removable printhead, comprising:

a control circuit that generates printhead control signals;

a timer processing unit coupled to the control circuit and including timing and control data useable by the control circuit to generate the printhead control signals; and a timer interface coupled to the timer processing unit that converts timing and control information received from a source outside the ink jet printer for a replacement printhead having a different resolution than a replaced printhead into the timing and control data to reprogram the timing and control data to that usable by the replacement printhead, wherein the timing specifications and control data include signals to control printhead positioning and a bit shift rate.

* * * * *